(12) United States Patent
Haulk et al.

(10) Patent No.: US 7,403,909 B2
(45) Date of Patent: Jul. 22, 2008

(54) SYSTEMS AND METHODS FOR ASYNCHRONOUS PROCESSING OF ELECTRONIC SHELF LABEL COMMUNICATION RESPONSES

(75) Inventors: Kevin Winton Haulk, Griffin, GA (US); Gordon Lee Edwards, III, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 1086 days.

(21) Appl. No.: 10/157,676

(22) Filed: May 29, 2002

(65) Prior Publication Data

US 2003/0225624 A1 Dec. 4, 2003

(51) Int. Cl.
*G06Q 20/00* (2006.01)

(52) U.S. Cl. .............. 705/20; 705/16; 705/22; 705/23; 705/28; 235/383; 235/385

(58) Field of Classification Search .......... 705/20, 705/28, 29; 235/383
See application file for complete search history.

(56) References Cited

U.S. PATENT DOCUMENTS

| | | | | |
|---|---|---|---|---|
| 5,704,409 | A * | 1/1998 | Brisson | 144/208.8 |
| 5,705,049 | A * | 1/1998 | Harrison | 205/446 |
| 5,758,064 | A * | 5/1998 | Zimmerman et al. | 340/10.2 |
| 6,089,453 | A * | 7/2000 | Kayser et al. | 235/383 |
| 6,144,942 | A * | 11/2000 | Ruckdashel | 705/9 |
| 6,737,600 | B2 * | 5/2004 | Takizawa | 209/583 |
| 6,762,674 | B2 * | 7/2004 | Matsushita | 340/5.91 |
| 7,151,453 | B2 * | 12/2006 | Ebert | 340/572.1 |
| 2002/0002421 | A1 * | 1/2002 | Murofushi | 700/214 |
| 2002/0016739 | A1 * | 2/2002 | Ogasawara | 705/22 |

* cited by examiner

*Primary Examiner*—F. Zeender
*Assistant Examiner*—M. Thein
(74) *Attorney, Agent, or Firm*—Priest & Goldstein PLLC

(57) ABSTRACT

An electronic price label (ESL) system for performing asynchronous ESL transactions. An event notification technique allows a communication base station (CBS) manager to directly notify an ESL manager when responses from an ESL are received, without the ESL manager needing to constantly poll the CBS manager. In one aspect, an inter-process communication layer (IPC) to allow for such event notification by the CBS manager. When initially beginning operation, the ESL manager subscribes to a CBS manager's event and provides the name of a function in the ESL manager to be called when this event occurs. When the ESL manager instructs the CBS manager to send a message to an ESL, the CBS manager provides the ESL manager with a handle or unique identification number to identify the message. When a response is received from the ESL, the CBS manager "fires an event" utilizing the IPC and indicates the identification number of the response. When the event is fired, it serves as a notification to the ESL manager that the response is available for processing and the ESL manager looks up the original message using the unique identification number originally provided by the CBS manager. The response is then processed by a separate thread in the ESL manager.

10 Claims, 3 Drawing Sheets

SYSTEMS AND METHODS FOR ASYNCHRONOUS PROCESSING OF ELECTRONIC SHELF LABEL COMMUNICATION RESPONSES

FIELD OF THE INVENTION

The present invention relates generally to improvements in electronic shelf label (ESL) systems used in transaction establishments. More specifically, the present invention relates to improved methods and apparatus for asynchronously processing responses received from electronic shelf labels.

BACKGROUND OF THE INVENTION

ESL systems typically include a plurality of ESLs for each merchandise item in a store. ESLs display the price of corresponding merchandise items on store shelves and are typically attached to a rail along the leading edge of the shelves. A store may contain thousands of ESLs to display the prices of the merchandise items. The ESLs are coupled to a central server where information about the ESLs is typically maintained in an ESL data file which contains ESL identification information and ESL merchandise item information. The central server sends messages, including register update messages, to the ESLs.

From the perspective of various software components operating on the central server, communication between ESLs and the central server is performed in an asynchronous manner due to the uncertainty of when a response from an ESL will be received and processed. In one prior art ESL system, the processing of the responses occurred by one software component constantly polling another software component to determine if a particular ESL transaction was complete. Such an approach results in unnecessary processing overhead and inefficiencies as a large number of polls would typically occur before the response is available. Therefore, it would be desirable to provide an ESL system and method that provides for an event notification for processing asynchronous ESL transactions.

SUMMARY OF THE INVENTION

The present invention advantageously provides methods and apparatus for an improved electronic shelf label (ESL) system and provides for an event notification technique which allows a communication base station (CBS) manager to directly notify an ESL manager when responses from an ESL are received, without the ESL manager needing to repetitiously poll the CBS manager on an ongoing basis. In one aspect, the present invention provides an inter-process communication layer (IPC) to allow for such event notification by the CBS manager. When initially beginning operation, the ESL manager subscribes to a CBS manager's event and provides the name of a function in the ESL manager to be called when this event occurs. When the ESL manager instructs the CBS manager to send a message to an ESL, the CBS manager provides the ESL manager with a handle or unique identification number to identify the message. When a response is received from the ESL, the CBS manager "fires an event" utilizing the IPC and indicates the identification number of the response. When the event is fired, it serves as a notification to the ESL manager that the response is available for processing and the ESL manager looks up the original message using the unique identification number originally provided by the CBS manager. The response may then processed by a separate thread in the ESL manager.

A more complete understanding of the present invention, as well as further features and advantages of the invention, will be apparent from the following detailed description and the accompanying drawings.

DETAILED DESCRIPTION

The present invention now will be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Further details of an ESL system suitable for use in conjunction with the present invention are found in U.S. patent application Ser. No. 10/044,021 filed Jan. 11,2001 entitled "Methods and Apparatus for Performing Delta Updates of an Electronic Shelf Label", U.S. patent application Ser. No. 10/044,610 filed Jan. 11, 2001 entitled "Methods and Apparatus for Intelligent Data Bedcheck of an Electronic Shelf Label" now U.S. Pat. No. 6,976,206, U.S. patent application Ser. No. 10/044,020 filed Jan. 11, 2001 entitled "Methods and Apparatus for Reduced Electronic Shelf Label Power Consumption" now U.S. Pat. No. 6,626,359, U.S. patent application Ser. No. 10/044,687 filed Jan. 11, 2001 entitled "Methods and Apparatus for Error Detection and Correction of an Electronic Shelf Label System Communication Error" now U.S. Pat. No. 6,877,133, U.S. patent application Ser. No. 10/044,439 filed Jan. 11, 2001 entitled "Methods and Apparatus for Automatically Locating an Electronic Shelf Label" now U.S. Pat. No. 6,885,287, U.S. patent application Ser. No. 10/044,440 filed Jan. 11, 2001 entitled "Methods and Apparatus for Conserving Battery Power in an Electronic Shelf Label System" now U.S. Pat. No. 7,073,081, U.S. patent application Ser. No. 10/044,688 filed Jan. 11, 2001 entitled "Methods and Apparatus for Automatic Assignment of a Communication Base Station and Timeslot for an Electronic Shelf Label" now U.S. Pat. No. 7,236,473, U.S. patent application Ser. No. 10/044,535 filed Jan. 11, 2001 entitled "Methods and Apparatus for Error Detection and Correction in an Electronic Shelf Label System" now U.S. Pat. No. 7,007,219, all of which are assigned to the assignee of the present invention and incorporated by reference herein in their entirety.

Figure 1:
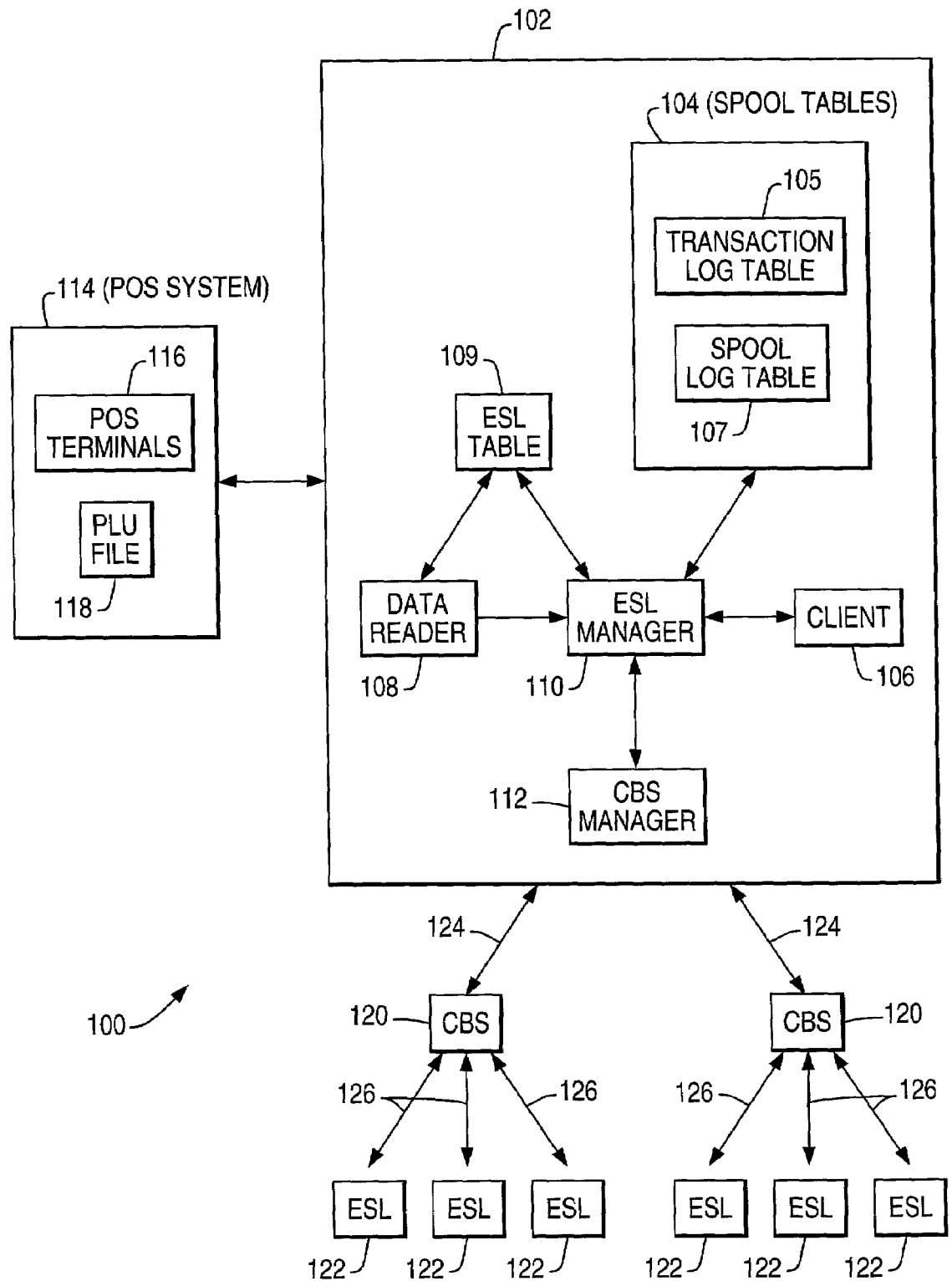
FIG. 1 shows a block diagram of a transaction management system in accordance with the present invention.

FIG. 1 shows a transaction management system 100 in accordance with the present invention. The system 100 includes an ESL host computer system 102 and a point-of-sale (POS) system 114. Here, components 102 and 114 are shown as separate components that are networked together, but they and their subcomponents may also be combined or divided in various ways.

The host computer system 102 includes an ESL table 109, spool tables 104, data reader 108, ESL manager 110, a client application 106 and a communication base station (CBS)

manager 112. POS system 114 includes a price look-up (PLU) file 118 and POS terminals 116.

The system 100 also includes CBSs 120 and ESLs 122. The CBSs 120 may be suitably mounted in or near the ceiling of the retail establishment. ESLs 122 are typically attached to store shelving adjacent to items. In one aspect, the system 100 includes a plurality of groups of ESLs 122 and a plurality of CBSs 120, with each group of ESLs 122 preferably assigned to one of the CBSs 120. A record of this assignment relationship is stored in system memory, for example, as part of the data stored in the ESL data file 109.

The ESL manager 110 records and schedules messages to the ESLs 122. The ESL manager 110 monitors and maintains an action list for the ESLs 122 utilizing spool tables 104 which include a transaction log table 105 and a spool log table 107. The ESL manager 110 provides a scheduling function for time related events which need to occur at a future point in time. Items or records on the action list may be provided from client applications, such as client application 106, as requests for work. These client applications may receive input from a terminal or user interface application. Additionally, items or records on the action list may be automatically generated by the ESL manager 110, or could be due to requests that required additional processing at a later date, such as, for example, a series of sale prices to be displayed at the ESLs at given times. Based on the events the ESL manager 110 has scheduled for an ESL 122, the ESL manager 110 creates the appropriate request and sends the request to the CBS manager 112. The requests may include register or memory updates of an ESL 122, diagnostic requests such as bedchecks, location requests such as finds, assignments to a particular timeslot, and the like. Based on the response returned from the ESL 122 via the CBS manager 112, the ESL manager 110 then updates the ESL table 109 and spool tables 104 as appropriate. Such updates may include marking a particular task as completed, updating the data image of the ESL 122, and the like. A client application, such as client application 106, may interface with the ESL manager 110 to initiate requests for a particular activity. The data reader 108 provides an interface from the ESL manager 110 to the POS system 114.

The ESL manager 110 interfaces with the transaction log table 105 and the spool log table 107, and utilizes these tables to maintain lists of actions to take. The transaction log table 105 includes a high level list and the spool log table 107 includes a low level list of actions to take. As an example, when the client application 106 makes a request to perform an update to a group of ESLs in the store, this request is processed and stored as a single record in the transaction log table 105. Since the request may affect many ESLs, the high-level transaction log request stored in the transaction log table 105 is resolved into a number of smaller requests, each affecting a specific ESL. When resolution of this record into individual requests occurs, a specific request or record for each affected ESL is created and placed in the spool log table 107. The ESL manager 110 then uses the spool log table 107 to decide what instructions to send to the CBS manager 112 by processing each spool log record and sending the indicated request to the CBS manager 112.

The ESL manager 110 includes a plurality of programming threads. A first thread loops through the transaction log table 105 looking for items to resolve into spool log records to be stored in the spool log table 107. A second thread loops through the spool log table 107 looking for items to send to the CBS manager 112. A third thread processes responses returned from the CBS manager 112. Additional threads may provide further processing capability.

The CBS manager 112 is responsible for all communications, processing, and monitoring of the CBSs. The CBS manager 112 receives information intended to be transmitted to the ESLs 122 and processes it into a form appropriate for use by the CBSs 120 and ESLs 122. The CBS manager 112 processes the response of a particular ESL 122 after a CBS 120 has received that response and then passed that response to the CBS manager 112. Additionally, the CBS manager 112 monitors the CBSs 120 for problems, performs diagnostics on the CBSs 120 and logs errors.

The messages are sent to the CBSs 120 through communication links 124. The communication links 124 may suitably utilize radio frequency (RF) communication, infrared (IR) communication, a wired link, or some combination of communication techniques. Groups of ESLs 122 are assigned to a particular CBS for communication. After receiving a message from the host system 102, a particular CBS 120 which has been assigned to an ESL 122 then transmits the message to the ESL 122 utilizing communication link 126, which may suitably utilize RF communication, IR communication, or some combination of communication techniques.

After receiving messages, the ESLs 122 transmit responses to CBSs 120 over communication links 126. The CBSs 120 then process and retransmit the response messages to the CBS manager 112 over communication links 124. The CBSs 120 may also detect the signal strength of the responses and report the signal strengths to the host computer system 102.

The ESL data file 109 consists of multiple records, with each record corresponding to a particular ESL 122 in a retail establishment. The record for each ESL 122 includes a number of fields, with each field containing the data which is supposed to be in one of the registers of the ESL 122. Thus, the record contains a picture, or fall data image, of what data is intended to be stored in the ESL 122, and consequently, what the ESL 122 should be displaying on the ESL's display. Additionally, each record may include a variety of additional non-display information related to the ESL 122, such as the timeslot the ESL 122 listens on, the CBS 120 assigned to the ESL 122, and the PLU number of the item associated with the ESL 122. The record may also contain diagnostic and tally information related to that ESL 122, such as when the last time a message was sent to the ESL 122, the last time the ESL 122 had a data bedcheck, a count of how many times the ESL 122 has failed its data bedcheck, and the like.

Figure 2:
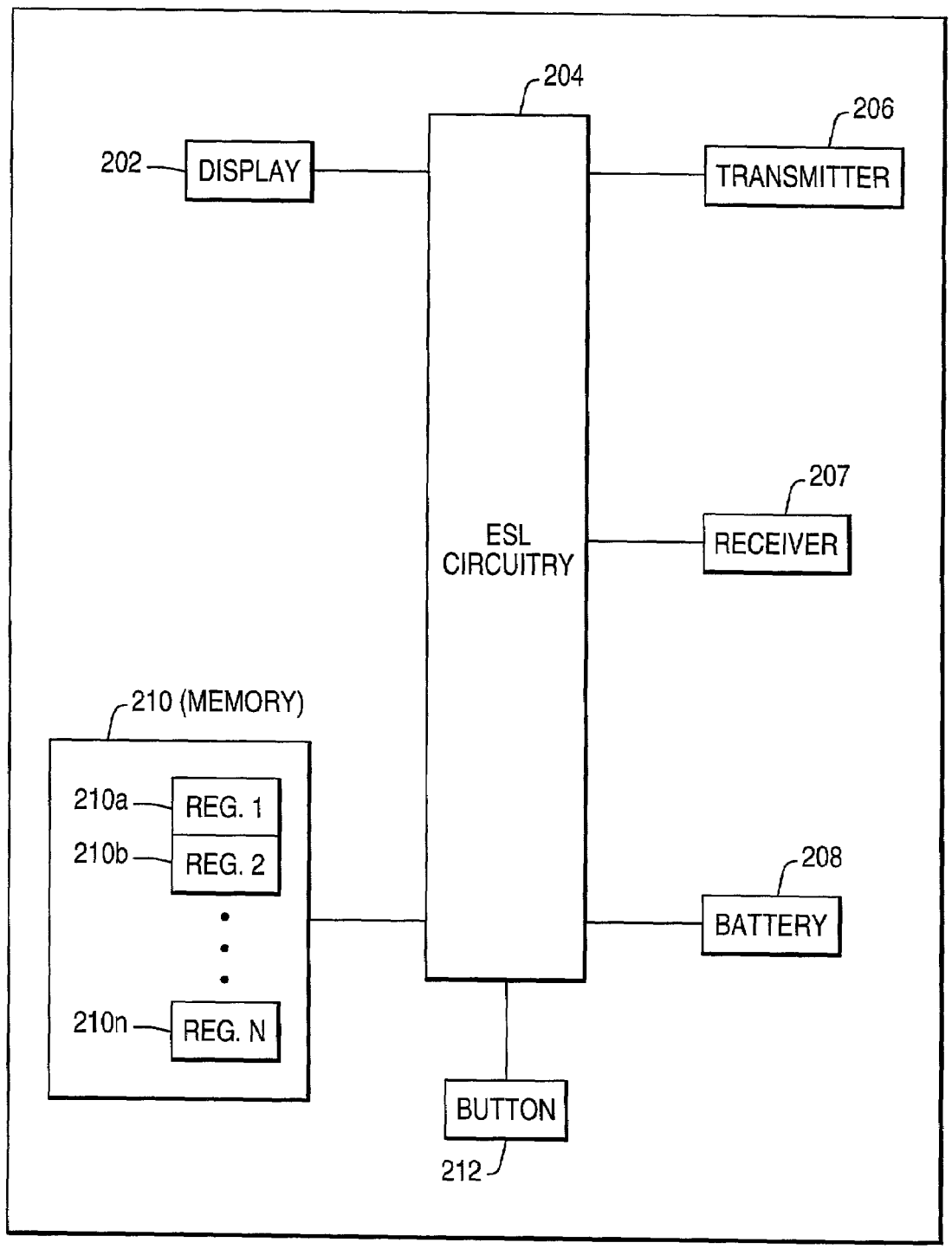
FIG. 2 is a block diagram of an ESL in accordance with the present invention.

FIG. 2 shows a block diagram of an exemplary ESL 122 in accordance with the present invention. A display 202 displays information, such as item price and related data. ESL 122 includes a transmitter 206 for transmitting messages and a receiver 207 for receiving messages. The transmitter 206 and receiver 207 may utilize RF communication, IR communication, a wired link or some combination of communication techniques. A battery 208 provides power for the operation of ESL 122. The operation of ESL 122 is controlled by ESL circuitry 204. ESL circuitry 204 decodes incoming messages received, and performs any actions indicated by the messages. For example, if a register update message is received, the ESL circuitry 204 would cause the appropriate register to be updated with the data. ESL memory 210 includes a plurality of registers, such as registers 210a, 210b, . . . , 210n. The ESL memory 210 may contain many types of information. For example, the memory 210 may include display registers which contain the actual text to be displayed by the ESL 122. This text may include item price, informative or promotional text, text directed to store employees, and the like. Other registers may contain data which controls various parameters related to the display of the text, such as display register selection and timing sequences, for example. The ESL 122 may also include a button 212 which may be depressed to initiate a particular function, such as, for example, the display of an alternate message.

As described above, from the perspective of the ESL manager 110, communication with the ESL's 122 occurs in an asynchronous fashion, due to the repetitious polling. For example, after the ESL manager 110 has instructed the CBS manager 112 to transmit one or more commands to an ESL 122, the ESL manager 110 cannot determine precisely when a response to the commands will be available from the CBS manager 112. The elimination of the need to periodically poll a CBS manager to determine when a response was available reduces unnecessary overhead and inefficiencies as many polls would typically occur before the response is available. The present invention provides for an event notification technique which allows the CBS manager 112 to directly notify the ESL manager 110 when responses from an ESL 122 are received, thus eliminating the need for the ESL manager 110 to repetitiously poll the CBS manager 112.

In one aspect, the present invention provides an inter-process communication layer (IPC) to allow for such event notification by the CBS manager 112. When initially beginning operation, the ESL manager 110 subscribes to a CBS manager's event and provides the name of a function in the ESL manager 110 to be called when this event occurs. During normal operation, when the ESL manager 110 instructs the CBS manager 112 to send a message to an ESL 122, the CBS manager 112 provides the ESL manager 110 with a handle or unique identification number to identify the message. When a response is received from the ESL 122, the CBS manager 112 "fires an event" utilizing the IPC and communicates the identification number of the response to the ESL manager 110. When the event is fired, it serves as a notification to the ESL manager 110 that the response is available for processing and the ESL manager 110 looks up the original message in the spool log using the unique identification number originally provided by the CBS manager. The response is then processed by a separate thread in the ESL manager 110.

In general, "event firing" is the passing or transmission of a unique event identifier and associated event data by a sender to a receiver whenever a particular situation occurs. Since the receiver does not know when or if the particular situation will occur, the receiver does not know when or if an event will be fired.

The IPC may suitably exist within the ESL manager 110 and the CBS manager 112 as a dynamic linked library (DLL). The IPC DLL defines low-level functionality in an IPC client class and an IPC server class. Thus, the CBS manager 112 may define both an application server class which inherits the IPC server class, and an application client class (corresponding to the application server class) which inherits the IPC client class. By inheriting from the IPC classes, the application server class and the application client class are provided with the low-level communication functionality of the IPC client and server classes.

It is noted that various software components may operate as both servers and clients. For example, the ESL manager 110 is a server software component, but operates as a client with respect the CBS manager 112. To allow the ESL manager 110 to receive notifications from the CBS manager 112, the ESL manager 110 links with an appropriate DLL, such as the IPC DLL or another DLL linked to the IPC DLL, to get access to the IPC client class and subscribe to a CBS manager's event.

Generally, a server application, such as the CBS manager 112, is passive with respect to a client application, such as the ESL manager 110. In other words, while the server application is performing a particular operation, it does not communicate with the client application about this operation unless the client application specifically sends tasks to the server, or requests information from the server. However, in some cases, it is useful to allow the server application to spontaneously provide the client application with some information related to the work the server application is performing, even if the client application did not ask for the information precisely at that moment. For this reason, the low level IPC client and server classes implement a way for a server application to initiate essentially unsolicited communication with a client application. So rather than the ESL manager 110 polling to see if anything has changed at the CBS manager 112 level, the CBS manager 112 lets the ESL manager 110 know if something has changed. The server application may initiate the communication when some predefined event occurs. If the client application desires to be notified of a particular event when the event occurs at the server application, the client application subscribes to the event via a function call defined in the low level IPC client class. Usually, the client application wants to perform some operation when this event occurs, so when the client application subscribes to the server application's event, the client application also provides the name of a function that is to be called on the client side whenever the event occurs. Such an operation may also be described as "hooking to a function".

When the ESL manager 110 begins operation, the ESL manager 110 instantiates a CBS manager client class. Using this class, the ESL manager subscribes to a special CBS manager event (the "request completed" event) and provides the name of a function in the ESL manager 110 to be called by the CBS manager 112 whenever the "request completed" event occurs. The ESL manager 110 then continues processing requests and sending information to the CBS manager 112 when necessary. After the ESL manager 110 sends a request to the CBS manager 112 to perform an operation (such as a register update, for example) on an ESL 122, the CBS manager 112 returns to the ESL manager 110 a unique identification number associated with the operation. The CBS manager 112 is responsible for initiating the communication to the CBS 120. The CBS 120 then transmits a message to a particular ESL 122 and the particular ESL 122 responds. The response is received by the CBS 120 and passed on to the CBS manager 112, who then "fires" the "request completed" event because the CBS manager 112 has completed the request for that ESL's 122 update. When the "request completed" event occurs, the CBS manager client class (previously instantiated by the ESL manager 110) initiates the calling of the function that the ESL manager 110 provided when the ESL manager 110 subscribed to the event. This ESL manager 110 function takes the data provided during the fire event (including the identification number), processes the data to determine exactly which ESL operation request was completed, looks up that request from the function's list, and finishes processing the update.

Due to the nature of event firing, it is possible that the ESL manager 110 may miss the "request completed" event. To compensate for such a situation, the ESL manager 110 may utilize a timeout period for outstanding messages sent to the CBS manager 112. If an outstanding message has not been processed during the timeout period, the ESL manager 110 may poll the CBS manager 112 to determine the status of the outstanding message, thus detecting and compensating for any missed events.

Figure 3:
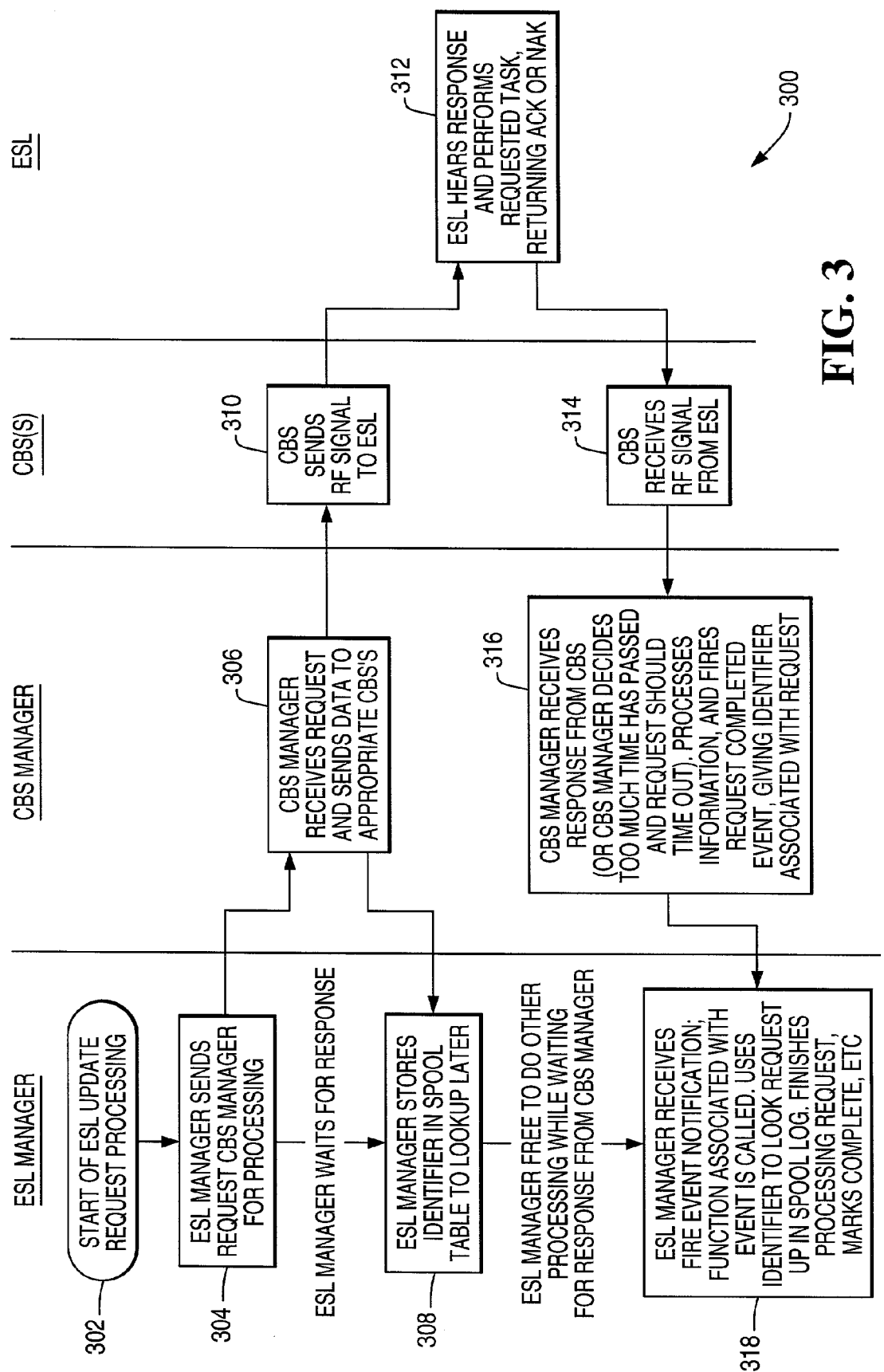
FIG. 3 shows a method of processing asynchronous ESL transactions in accordance with the present invention.

FIG. 3 shows a method 300 of asynchronously processing responses by an ESL manager, such as ESL manager 110, in accordance with the present invention. In step 302, the ESL manager begins processing an ESL transaction. Such a transaction may include a register update, for example. In step 304, the ESL manager sends a request utilizing an inter-process communication layer (IPC) to the CBS manager instructing the CBS manager to perform the transaction. For a register update operation, the ESL manager may provide an ESL data image to the CBS manager. In step 306, the CBS manager processes the request and sends the appropriate data to the CBSs for transmission to the ESL. The CBS manager also provides a return message to the ESL manager utilizing the IPC indicating that the request was received successfully and including an identification number for the request. In step 308, the ESL manager receives the identification number and stores the identification number in a spool table. Now, the ESL manager is free to continue other processing while waiting for a response from the CBS manager.

In step 310, one or more CBS s transmit a message to the ESL. In a preferred embodiment, each CBS utilizes RF communication techniques to transmit the message. In step 312, the ESL receives the message, performs the requested task and returns a positive or negative acknowledgement to the CBS. In step 314, the CBS receives the response from the ESL and passes the acknowledgment to the CBS manager. In step 316, the CBS manager receives the response, processes the information and, utilizing the IPC, fires a "request completed" event, giving the identifier associated with the request. Alternatively, if a predetermined time period has elapsed since the request was sent, the CBS manager may determine that too much time has passed and fire the "request completed" event. In step 318, the ESL manager receives the fire event notification and a function associated with the event is called. The function uses the identifier to look up the request in the spool log and finishes processing the request.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents.

We claim:

1. A method of performing asynchronous electronic shelf label (ESL) transactions utilizing an ESL system comprising a communication base station (CBS) manager and an ESL manager comprising the steps of:

issuing a transaction request by an ESL manager to the CBS manager, said transaction request including an action to be performed by an ESL and indicating an ESL function in the ESL manager to be called when the CBS manager establishes the transaction request has been completed;

returning an identification number associated with the transaction request from the CBS manager to the ESL manager;

transmitting one or more messages to the ESL to perform the transaction request;

establishing the transaction request has been completed by the CBS manager upon receiving a response from the ESL to the one or more transmitted messages;

calling the ESL function and providing the identification number associated with the transaction request; and retrieving a record of the transaction request by utilizing the identification number.

2. The method of claim 1 further comprising instantiating a CBS manager client class.

3. The method of claim 2 wherein the CBS manager client class instantiated by the ESL manager calls the ESL function.

4. The method of claim 1 wherein the CBS manager operates as a server application and the ESL manager operates as a client application with respect to the CBS manager.

5. The method of claim 1 wherein communication between the ESL manager and the CBS manager utilizes an inter-process communication layer (IPC) included within the ESL manager and the CBS manager as a dynamic linked library (DLL).

6. An electronic shelf label (ESL) system comprising:
   an ESL displaying informational text; and
   a host computer comprising an ESL manager and a communication base station (CBS) manager, said ESL manager issuing a transaction request to the CBS manager including an action to be performed by an ESL and indicating an ESL function in the ESL manager to be called when the CBS manager establishes the transaction request has been completed,
   wherein said CBS manager returns an identification number associated with the transaction request to the ESL manager, initiates the transmission of one or more messages to the ESL to perform the transaction request, waits for a response from the ESL to the one or more messages, establishes the transaction request has been completed, and calls the ESL function and provides the identification number associated with the transaction request,
   wherein said ESL manager processes the completed transaction request by the ESL function utilizing the identification number.

7. The system of claim 6 wherein the ESL manager instantiates a CBS manager client class.

8. The system of claim 7 wherein the CBS manager client class instantiated by the ESL manager calls the ESL function.

9. The system of claim 6 wherein the CBS manager operates as a server application and the ESL manager operates as a client application with respect to the CBS manager.

10. The system of claim 6 wherein communication between the ESL manager and the CBS manager utilizes an inter-process communication layer (IPC) included within the ESL manager and the CBS manager as a dynamic linked library (DLL).

* * * * *